(12) United States Patent
Zhu

(10) Patent No.: US 12,085,945 B2
(45) Date of Patent: Sep. 10, 2024

(54) RANDOM SHIFT BASED PATH CENTERING SYSTEM FOR AUTONOMOUS VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 241 days.

(21) Appl. No.: 16/927,013

(22) Filed: Jul. 13, 2020

(65) Prior Publication Data

US 2022/0011775 A1 Jan. 13, 2022

(51) Int. Cl.
*G05D 1/00* (2024.01)
*B60W 60/00* (2020.01)

(52) U.S. Cl.
CPC ....... *G05D 1/0221* (2013.01); *B60W 60/0011* (2020.02); *G05D 1/0088* (2013.01)

(58) Field of Classification Search
CPC ........ B60W 2554/801; B60W 60/0011; G05D 1/0005; G05D 1/0088; G05D 1/0221; G05D 2201/0213
See application file for complete search history.

(56) References Cited

U.S. PATENT DOCUMENTS

| | | | |
|---|---|---|---|
| 11,097,735 B1 * | 8/2021 | Marasigan | G08G 1/096716 |
| 11,526,721 B1 * | 12/2022 | O'Malley | G06F 30/15 |
| 2016/0247093 A1 * | 8/2016 | Rachitsky | G06Q 10/06398 |
| 2016/0327947 A1 * | 11/2016 | Ishikawa | B60W 30/12 |
| 2018/0032082 A1 * | 2/2018 | Shalev-Shwartz | G01C 21/3602 |
| 2018/0164822 A1 * | 6/2018 | Chu | G01C 21/3492 |
| 2019/0086925 A1 * | 3/2019 | Fan | G01C 21/3837 |
| 2019/0113927 A1 * | 4/2019 | England | G06N 5/046 |
| 2019/0186930 A1 * | 6/2019 | Chen | G08G 1/202 |
| 2019/0294167 A1 * | 9/2019 | Kutila | G01C 21/3461 |
| 2020/0134763 A1 * | 4/2020 | Ghannam | G06V 10/17 |
| 2020/0189583 A1 * | 6/2020 | Tatourian | B60W 60/0025 |
| 2020/0310423 A1 * | 10/2020 | Cho | G06N 3/02 |
| 2020/0319641 A1 * | 10/2020 | Tsuda | G05D 1/0274 |
| 2020/0363501 A1 * | 11/2020 | Lau | G01S 15/931 |
| 2021/0139048 A1 * | 5/2021 | Russell | G08G 1/166 |
| 2021/0234683 A1 * | 7/2021 | He | G06F 16/1834 |

* cited by examiner

*Primary Examiner* — Matthew J. Reda

(74) *Attorney, Agent, or Firm* — WOMBLE BOND DICKINSON (US) LLP

(57) ABSTRACT

Embodiments of the present disclosures disclose a method and a system to generate a path planning trajectory with a random lateral shift for an autonomous driving vehicle (ADV). In one embodiment, a system generates a reference line to navigate the ADV from a start location to a destination location. The system determines a lateral shift distance value to shift a lane center for the reference line. The system generates a shifted trajectory using the reference line based on the lateral shift distance value. The system controls the ADV based on the shifted trajectory to navigate the ADV.

21 Claims, 8 Drawing Sheets

RANDOM SHIFT BASED PATH CENTERING SYSTEM FOR AUTONOMOUS VEHICLES

TECHNICAL FIELD

Embodiments of the present disclosure relate generally to operating autonomous driving vehicles. More particularly, embodiments of the disclosure relate to a random shift based path centering system for autonomous driving vehicles (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

A control module of an autonomous driving vehicle can be more deterministic in its repetitive tasks than human drivers. For example, a vehicle route from the same source and destination locations may lead to the same path planning. However, this could result in a problem that vehicles are always running on exactly the same part of the road, which may lead to damage to the road surface.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the present disclosures disclose a method and a system to generate a path planning trajectory with a random lateral shift for an autonomous driving vehicle (ADV). In one embodiment, a system generates a reference line to navigate the ADV from a start location to a destination location. The system randomly determines a lateral shift distance value to shift the reference line to either left or right of the reference line. The system generates a shifted trajectory using the reference line based on the lateral shift distance value. The system controls the ADV based on the shifted trajectory to navigate the ADV.

Figure 1:
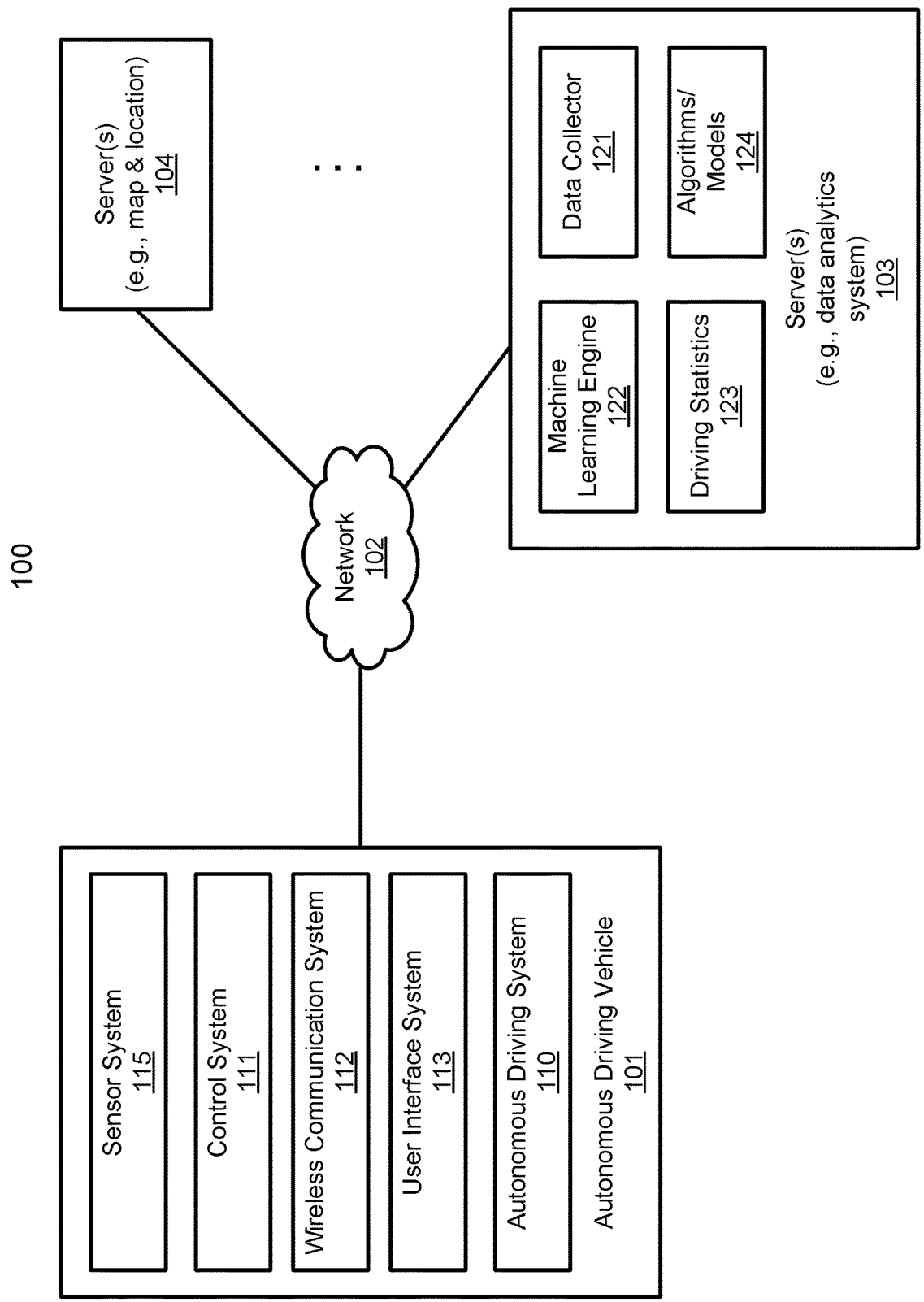
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
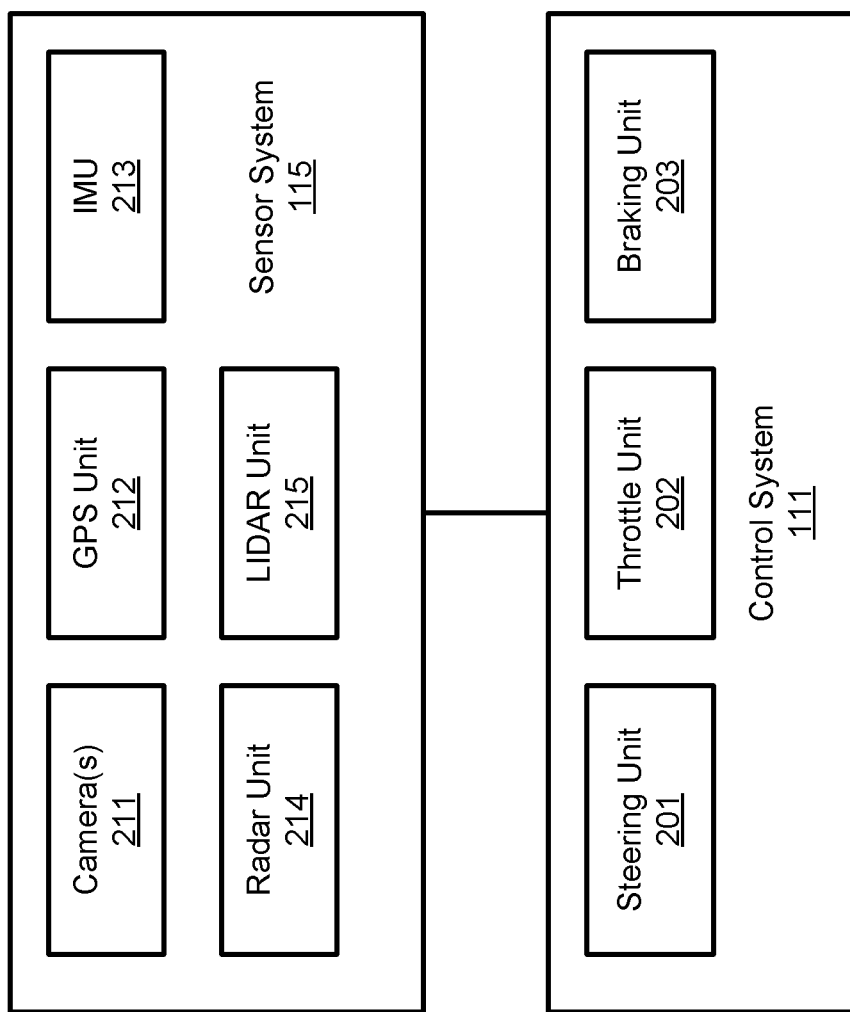
FIG. 2 is a block diagram illustrating an example of an autonomous driving vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms to apply a lateral shift/offset to a path planning trajectory for an ADV. Algorithms 124 can then be uploaded on ADVs to be utilized during autonomous driving in real-time.

Figure 3A:
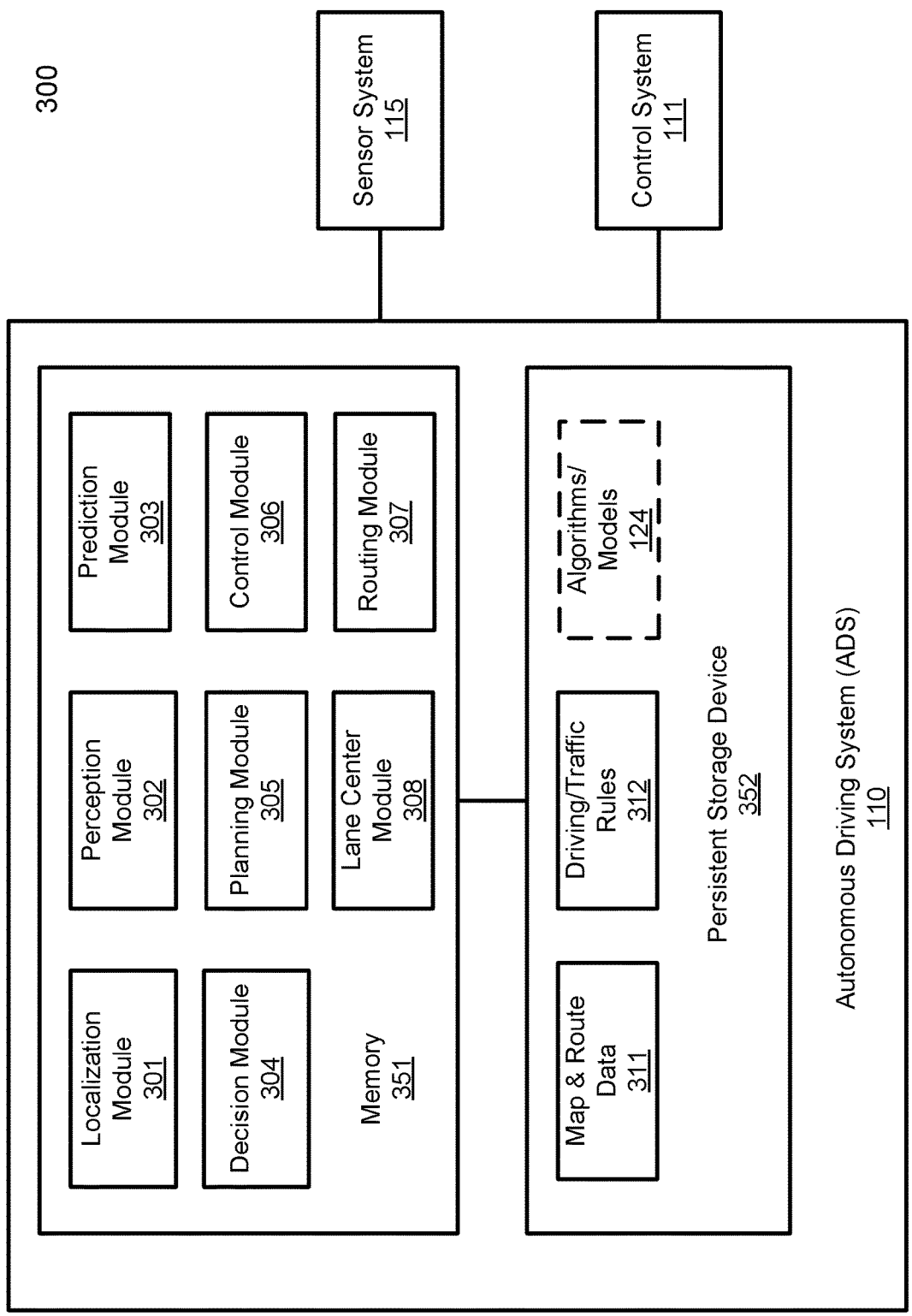
FIGS. 3A-3B are block diagrams illustrating an example of an autonomous driving system used with an autonomous driving vehicle according to one embodiment.
Figure 3B:
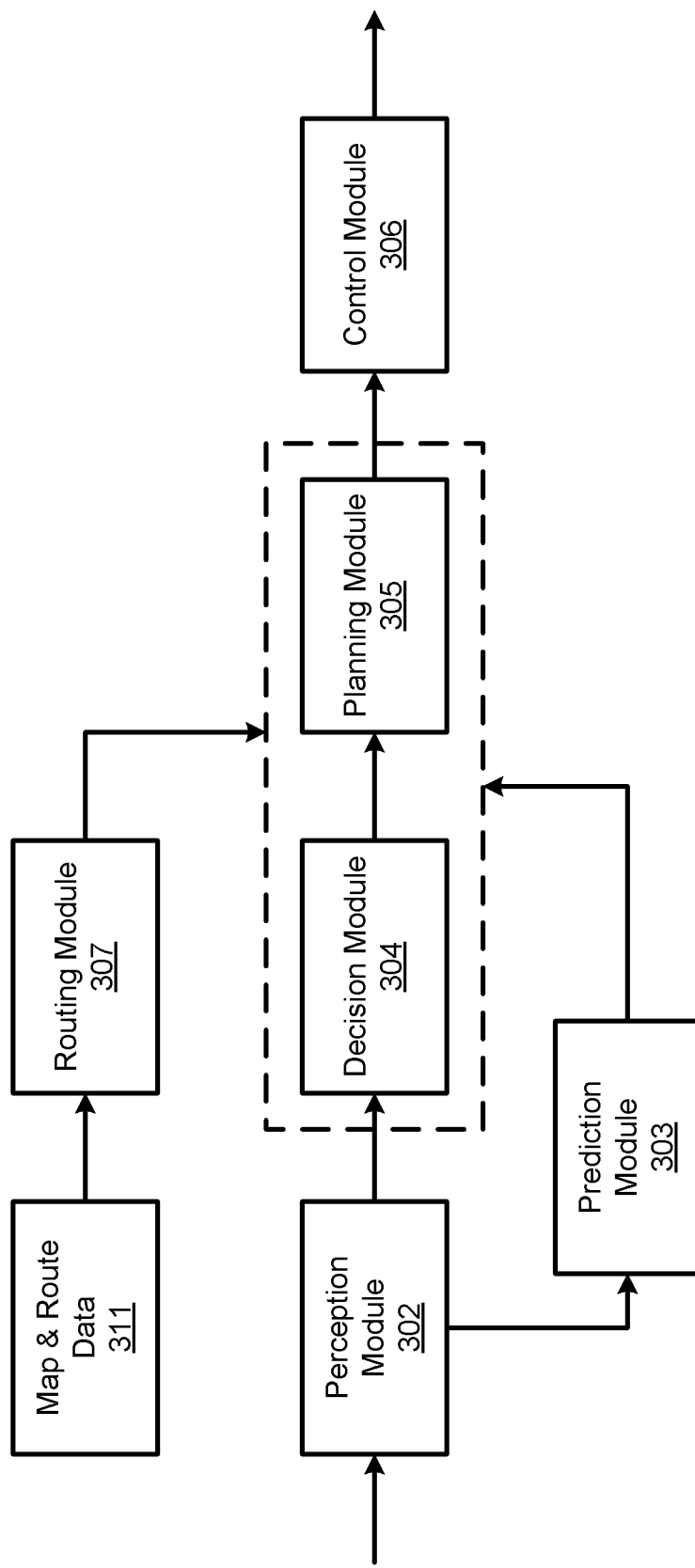

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and lane center module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
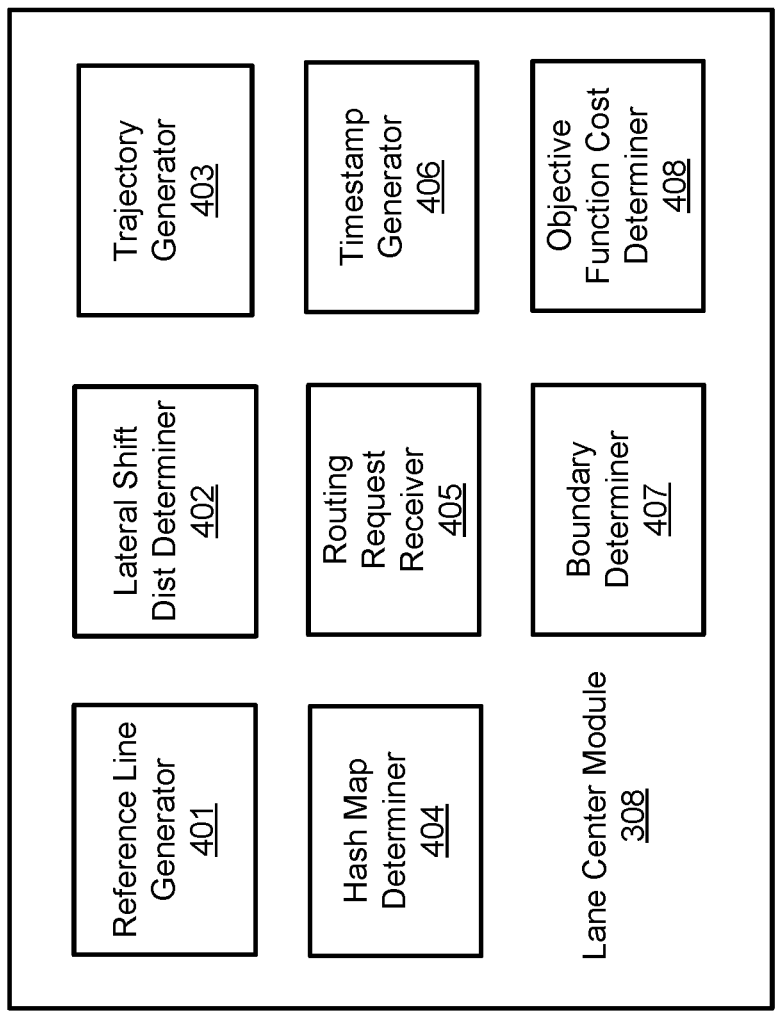
FIG. 4 is a block diagram illustrating a lane center shift module according to one embodiment.

FIG. 4 is a block diagram illustrating an example of a lane center shift module according to one embodiment. Lane center module 308 may be implemented as part of planning module 305 of FIG. 3A. Lane center module 308 can generate a path planning trajectory with a randomized lateral shift when ADV 101 requests for a route. Referring to FIG. 4, lane center module 308 may include submodules such as reference line generator 401, lateral shift distance determiner 402, trajectory generator 403, hash map determiner 404, routing request receiver 405, timestamp generator 406, lane boundary determiner 407, and objective/cost function determiner 408. Some or all of modules 401-408 may be integrated into fewer modules or a single module.

Reference line generator 401 can generate a reference line for path planning in response to a route request. The reference line can route an ADV from a source to a destination location. The reference line can correspond to a center of the lanes taken by the route/reference line. Lateral shift distance determiner 402 can determine a distance value to laterally shift the center of the lanes by the distance value for portions of, or the entire, route. Trajectory generator 403 can generate a path planning trajectory to control the ADV. Hash map determiner 404 can determine a hash map to generate a random value to laterally shift a trajectory by the random value. Routing request receiver 405 can receive a route request to route an ADV from a start destination to an end destination. The route requests can be received from an operator of the ADV, the ADV, or a server in communication with the ADV. Timestamp generator 406 can generate a timestamp for the route. For example, the timestamp generator 406 can generate a timestamp based on a time when module 308 receives a route request. Lane boundary determiner 407 can determine the lane boundaries (left and/or right) for a segment of a current route. The lane boundary can include a distance information from the edge of the boundary to a center of the lane. Objective/cost function determiner 408 can determine the objective/cost function used to generate a path planning trajectory.

Figure 5:
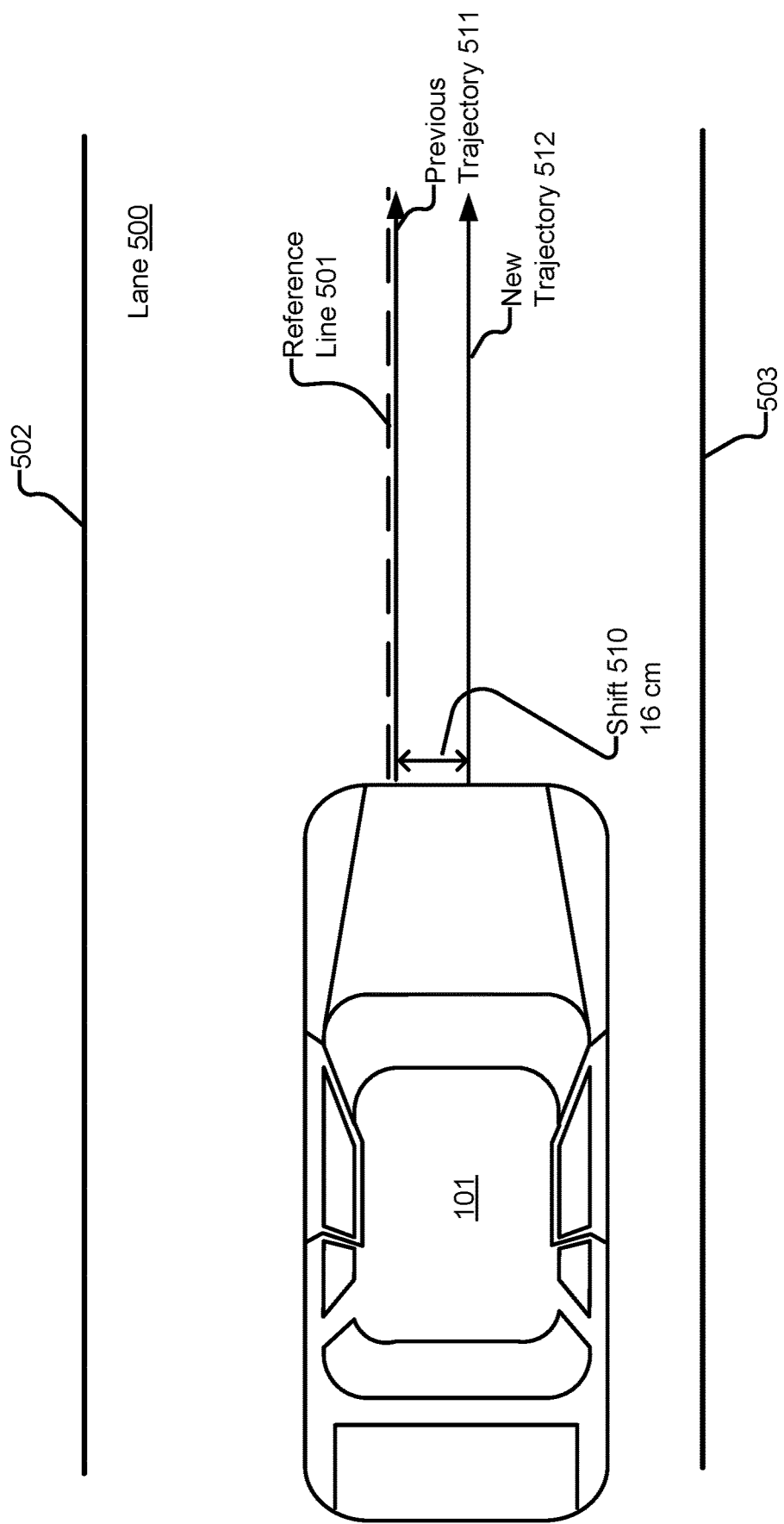
FIG. 5 illustrates a top-down view of a lane segment for an ADV with a laterally shifted trajectory according to one embodiment.

FIG. 5 illustrates a top-down view of a lane segment for an ADV with a laterally shifted trajectory according to one embodiment. The lateral shift of the trajectory for ADV 101 can be performed by module 308 of FIG. 4. Referring to FIG. 5, for one embodiment, an operator (not shown) of an ADV 101 submits a route request to ADV 101 to plan a route to navigate ADV 101 from a current location to a destination location (not shown). Based on the route request, ADV 101 generates a reference line 501 using map and route data, such as map and route data 311 of FIG. 3A. The reference line 501 can connect segments of lanes for a planned route. Reference line 501 may be a smooth reference line generated by routing module 307 or may be calculated based on map geometric information such as midpoint values traced along a lane from side curbs and/or lane dividers/markers for a driving trajectory.

In one embodiment, the driving trajectory is represented by a number of segments or piecewise polynomials. In one embodiment, a piecewise polynomial is as follow:

$$l(s)=a_i+b_i \times s+c_i \times s^2+d_i \times s^3+e_i \times s^4+f_i \times s^5 (0 \le s \le s_i)$$

where (s, l) are station and lateral coordinates, $a_i, \ldots, f_i$ are coefficients for a fifth order piecewise polynomial and i=0 . . . n, for n piecewise polynomials representing the spline. Note, piecewise polynomials can be any degree of polynomials depending on route or road conditions.

In one embodiment, ADV 101 determines left lane boundary 502 and right lane boundary 503 of the road/lanes 500 for each lane segment along the planned route. Based on a set of constraints for the left and right lane boundaries 502-503 (e.g., ADV should not be within a threshold distance, such as 10 cm, from the boundaries when navigating along the lane), ADV can generate one or more driving trajectories constrained by the boundary conditions. An optimal trajectory is then selected as the driving trajectory.

In one embodiment, ADV 101 defines an objective/cost function for trajectory optimization. The constraints and the objective function can be solved iterative by an optimization algorithm, e.g., dynamic programming (DP) or quadratic programming (QP) algorithm, or any other types of optimization algorithms.

In some embodiments, the objective function for path optimization includes a path cost function with a number of kernels, such as smoothness costs kernels and a guidance cost kernel. In one embodiment, a centering cost is part of the guidance cost and the centering cost can be linearly, exponentially, and/or quadratically proportional to a lateral displacement/offset. An example objective/cost function having the four kernels can be as follow:

$$\text{path cost} = \sum_{i=1}^{n} \left( w_1 \int_0^{s_i} (l_i'(s))^2 ds + w_2 \int_0^{s_i} (l_i''(s))^2 ds + w_3 \int_0^{s_i} (l_i'''(s))^2 ds + w_4 \int_0^{s_i} (l_i(s) - l_{ref}(s) + \text{offset}(s))^2 ds \right)$$

with the kernels in the ordering of a first derivative smoothness, a second derivative smoothness, a third derivative smoothness, and a guidance kernel, where (s, l) are station and lateral coordinates, $w_1 \ldots w_3$ are weight factors for smoothness costs, $w_4$ is a weight factor for a guidance cost, $l_i(s)$ is the ith piecewise polynomial, $l_{ref}(s)$ can be a reference line, and offset(s) is a lateral displacement/offset/shift applied to the trajectory.

Here, the smoothness costs ensure the piecewise polynomials are smoothed to the third derivative. The additional guidance cost can apply a lateral shift (or a new lane center) to a generated trajectory.

Referring to FIG. 5, in one embodiment, when no lateral shift/offset is applied, optimization of the objective function/ constraints generates a trajectory 511. In one embodiment, when a lateral shift/offset 510 is applied (for this example, 16 centimeters in offset/shift/displacement is applied), optimization of the objective function/constraints generates a trajectory 512. Referring to FIG. 5, trajectory 512 is shifted/offset about 16 centimeters to a right of trajectory 511.

Figure 6:
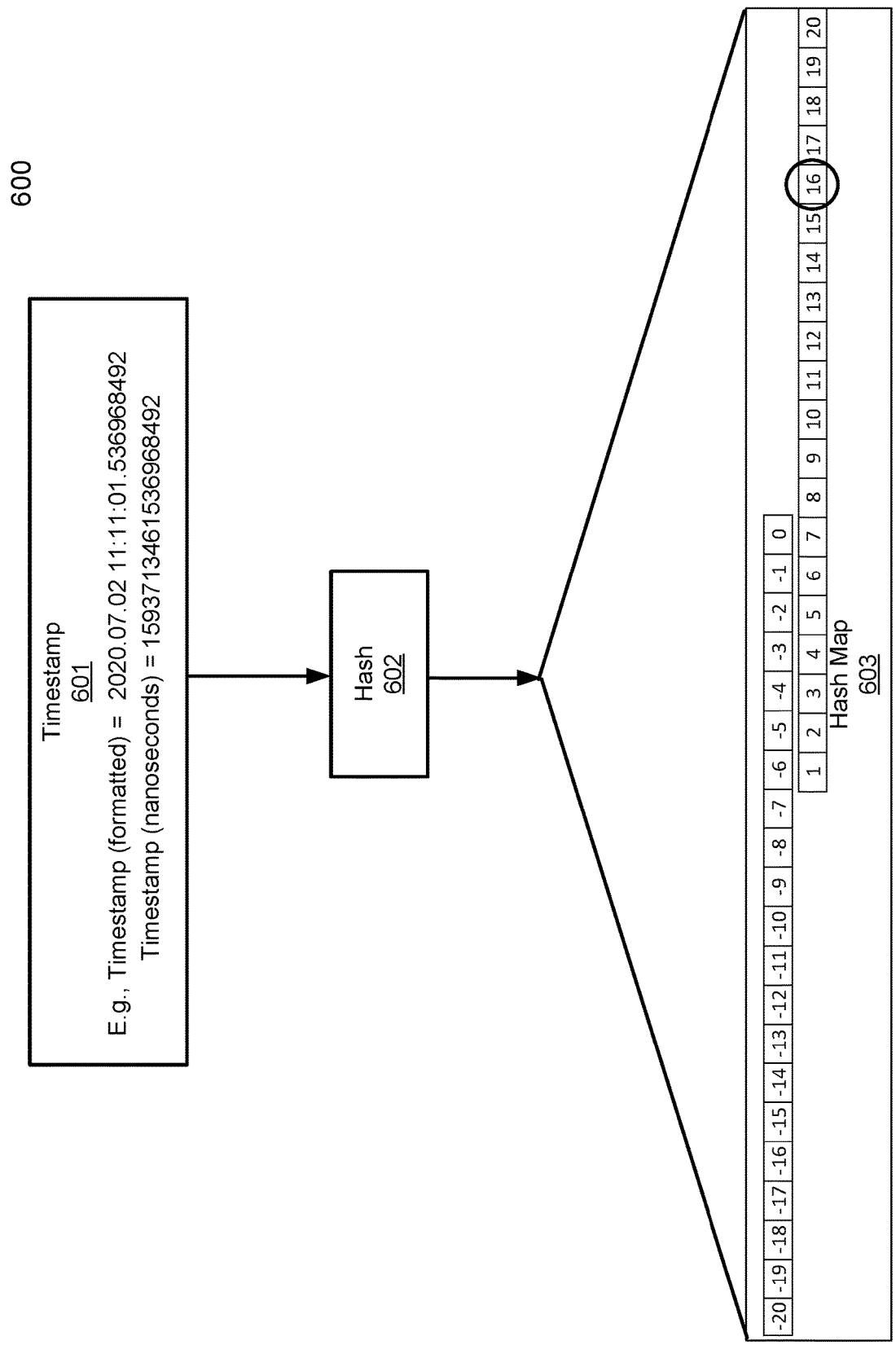
FIG. 6 is a block diagram illustrating generation of a lateral shift distance value according to one embodiment.

FIG. 6 is a block diagram illustrating generation of a lateral shift distance value according to one embodiment. Block 600 illustrates generation of a random distance offset value based on a timestamp using a hash map. In one embodiment, ADV 101 timestamps a route request for a planned route at a time of the request or at a time when module 308 receives the route request. In one embodiment, timestamp 601 has a granularity of a nanosecond. Note, although a nanosecond granularity is shown, other granularities are possible (microsecond, millisecond, etc.).

In one embodiment, ADV 101 applies a hash 602 to the timestamp 601. In one embodiment, hash 602 includes hashing the timestamp 601 using a hash function and distributing the hashed timestamp over a predetermined hash map 603. In one embodiment, the hashing function can include a cyclic redundancy check (CRC), message-digest (MD), Secure Hash Algorithm (SHA), or any other types of hashing function. The distributing of the hashed timestamp can include applying a remainder or mod function to the hashed timestamp.

Referring to FIG. 6, an example of a hash map 603 can include slots −20 to 20. The slots can represent the lateral offset distances in centimeters. In this case, the example timestamp in nanoseconds format of 1593713461536968492 can be hashed and distributed to slot 16 of the possible range of −20 to 20 slots. Here, slot 16 in this example represents a lateral shift of 16 centimeters to a right of the lane center. The nature of the hash function would distribute, evenly, over time, the lateral shift values over the range of the hash map, e.g., −20 to 20 centimeters offset. The evenly distributed lateral shifts allows distributed tire damages caused by ADV 101 and other ADVs to the road surfaces. Although the −20 to 20 centimeter offsets are illustrated as an example, other offset values are possible.

Figure 7:
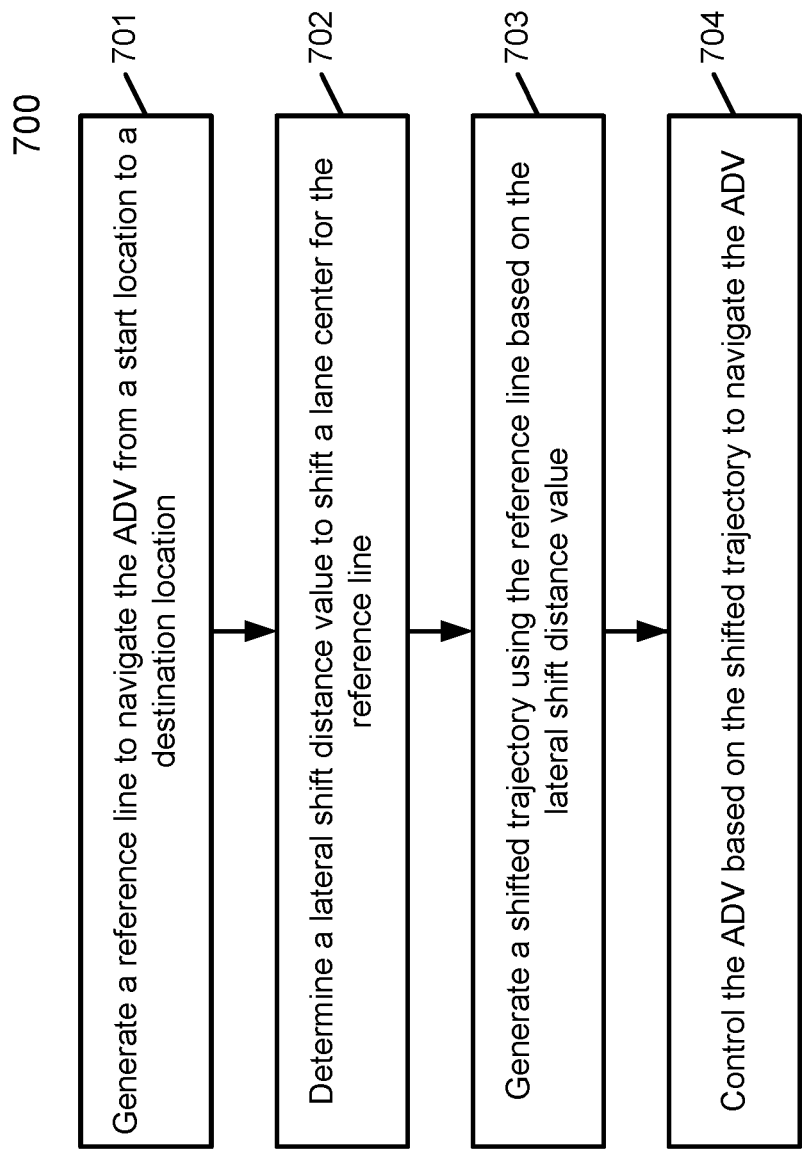
FIG. 7 is a flow diagram illustrating a method according to one embodiment.

FIG. 7 is a flow diagram illustrating a method according to one embodiment. Processing 700 may be performed by processing logic which may include software, hardware, or a combination thereof. For example, process 700 may be performed by lane center module 308 of FIG. 3A. Referring to FIG. 7, at block 701, processing logic generates a reference line to navigate the ADV from a start location (e.g., current location) to a destination location. At block 702, processing logic determines a lateral shift distance value to shift a lane center for the reference line. At block 703, processing logic generates a shifted trajectory using the reference line based on the lateral shift distance value. At block 704, processing logic controls the ADV based on the shifted trajectory to navigate the ADV.

In one embodiment, processing logic further sends a routing request to request a route from the start location to the destination location, where the lateral shift distance value is determined randomly based on a timestamp of the routing request. In one embodiment, processing logic further hashes the routing request timestamp using a hash function and distributes the hashed routing request timestamp across a hash map to determine the lateral shift distance value.

In one embodiment, the distributing comprises applying a modulo operation to the hashed routing request timestamp to distribute the hashed routing request timestamp across the hash map. In one embodiment, the hash map includes a predetermined number of slots representing a range of distance shift values, wherein each slot represents a distance shift value in the range of distance shift values.

In one embodiment, the shifted trajectory is generated based on a path planning objective function, where the path planning objective function includes a cost to center the trajectory to the reference line. In one embodiment, processing logic further determines a first distance to left lane boundary from the reference line and a second distance to right lane boundary from the reference line, where the path planning objective function is constrained by the first and the second distances to keep the ADV a threshold distance from the left lane boundary and the right lane boundary.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to operate an autonomous driving vehicle (ADV), the method comprising:
   identifying a range of possible lateral shift distance values from a negative lateral shift distance to a positive lateral shift distance;
   generating a hash map relating hash values produced by a hash function to a set of slots, each slot in the set of slots associated with a unique lateral shift distance in the range of possible lateral shift distance values, and the hash function configured to evenly distribute the hash values over the set of slots in the hash map;
   receiving a routing request for a route from a start location to a destination location for the ADV;
   generating, based on the routing request, a reference line to navigate the ADV from the start location to the destination location;
   generating a timestamp based on a time when the routing request is received;
   determining a hash value of the timestamp with the hash function;
   identifying a slot in the set of slots based on the hash value and the hash map;
   determining a lateral shift distance value for the route as the unique lateral shift distance associated with the slot, the lateral shift distance value comprising a negative value, and the lateral shift distance value to shift a lane center for the reference line;
   generating a shifted trajectory using the reference line based on a path planning objective function including a path cost function, the path cost function comprising a plurality of kernels including a plurality of smoothness costs kernels and a guidance cost kernel, the guidance cost kernel including a cost to center the shifted trajectory to the reference line, wherein the cost to center the shifted trajectory to the reference line is based on the lateral shift distance value; and
   controlling the ADV based on the shifted trajectory to navigate the ADV.

2. The method of claim 1, wherein identifying the slot in the set of slots based on the hash value and the hash map comprises applying a modulo operation to the hash value to distribute the hash value across the hash map.

3. The method of claim 1, further comprising:
   determining a first distance to left lane boundary from the reference line and a second distance to right lane boundary from the reference line,
   wherein the path planning objective function is constrained by the first and the second distances to keep the ADV a threshold distance from the left lane boundary and the right lane boundary.

4. The method of claim 1, wherein the cost to center the shifted trajectory to the reference line is linearly or exponentially proportional to the lateral shift distance value for the route.

5. The method of claim 1, wherein the plurality of smoothness kernels include a first derivative smoothness kernel, a second derivative smoothness kernel, and a third derivative smoothness kernel.

6. The method of claim 5, wherein the path cost function includes a first weight factor for the first derivative smoothness kernel, a second weight factor for the second derivative smoothness kernel, a third weight factor for the third derivative smoothness kernel, and a fourth weight factor for the guidance cost kernel.

7. The method of claim 1, wherein the path cost function comprises:

$$\sum_{i=1}^{n} \left( w_1 \int_0^{s_i} (l_i'(s))^2 ds + w_2 \int_0^{s_i} (l_i''(s))^2 ds + w_3 \int_0^{s_i} (l_i'''(s))^2 ds + w_4 \int_0^{s_i} (l_i(s) - l_{ref}(s) + \text{offset}(s))^2 ds \right).$$

8. The method of claim 1, further comprising generating the timestamp in a nanosecond format.

9. The method of claim 1, wherein one slot in the set of slots is associated with a lateral distance value of zero.

10. A non-transitory machine-readable medium having instructions stored therein, which when executed by a processor, cause the processor to perform operations, the operations comprising:
   identifying a range of possible lateral shift distance values from a negative lateral shift distance to a positive lateral shift distance;
   generating a hash map relating hash values produced by a hash function to a set of slots, each slot in the set of slots associated with a unique lateral shift distance in the range of possible lateral shift distance values, and the hash function configured to evenly distribute the hash values over the set of slots in the hash map;
   generating a reference line to navigate an autonomous driving vehicle (ADV) from a start location to a destination location based on a routing request for a route from the start location to the destination location;
   generating a timestamp based on a time when the routing request is received;
   determining a hash value of the timestamp with the hash function;
   identifying a slot in the set of slots based on the hash value and the hash map;
   determining a lateral shift distance value for the route as the unique lateral shift distance associated with the slot, the lateral shift distance value comprising a negative value, and the lateral shift distance value to shift a lane center for the reference line;
   generating a shifted trajectory using the reference line based on a path planning objective function including a path cost function, the path cost function comprising a plurality of kernels including a plurality of smoothness costs kernels and a guidance cost kernel, the guidance cost kernel including a cost to center the shifted trajectory to the reference line, wherein the cost to center the shifted trajectory to the reference line is based on the lateral shift distance value; and controlling the ADV based on the shifted trajectory to navigate the ADV.

11. The non-transitory machine-readable medium of claim 10, wherein identifying the slot in the set of slots based on the hash value and the hash map comprises applying a modulo operation to the hash value to distribute the hash value across the hash map.

12. The non-transitory machine-readable medium of claim 10, wherein the operations further comprise:

determining a first distance to left lane boundary from the reference line and a second distance to right lane boundary from the reference line, wherein the path planning objective function is constrained by the first and the second distances to keep the ADV a threshold distance from the left lane boundary and the right lane boundary.

13. The non-transitory machine-readable medium of claim 10, wherein the cost to center the shifted trajectory to the reference line is exponentially or quadratically proportional to the lateral shift distance value for the route.

14. The non-transitory machine-readable medium of claim 10, wherein the operations further comprise generating the timestamp in a nanosecond format.

15. The non-transitory machine-readable medium of claim 10, wherein one slot in the set of slots is associated with a lateral distance value of zero.

16. A data processing system, comprising:

a processor; and a memory coupled to the processor to store instructions, which when executed by the processor, cause the processor to perform operations, the operations including identifying a range of possible lateral shift distance values from a negative lateral shift distance to a positive lateral shift distance;

generating a hash map relating hash values produced by a hash function to a set of slots, each slot in the set of slots associated with a unique lateral shift distance in the range of possible lateral shift distance values, and the hash function configured to evenly distribute the hash values over the set of slots in the hash map;

generating a reference line to navigate an autonomous driving vehicle (ADV) from a start location to a destination location based on a routing request for a route from the start location to the destination location;

generating a timestamp based on a time of generating the routing request;

determining a hash value of the timestamp with the hash function;

identifying a slot in the set of slots based on the hash value and the hash map;

determining a lateral shift distance value for the route as the unique lateral shift distance associated with the slot, the lateral shift distance value comprising a negative value, and the lateral shift distance value to shift a lane center for the reference line;

generating a shifted trajectory using the reference line based on a path planning objective function including a path cost function, the path cost function comprising a plurality of kernels including a plurality of smoothness costs kernels and a guidance cost kernel, the guidance cost kernel including a cost to center the shifted trajectory to the reference line, wherein the cost to center the shifted trajectory to the reference line is based on the lateral shift distance value; and controlling the ADV based on the shifted trajectory to navigate the ADV.

17. The system of claim 16, wherein identifying the slot in the set of slots based on the hash value and the hash map comprises applying a modulo operation to the hash value to distribute the hash value across the hash map.

18. The system of claim 16, wherein the operations further comprise:

determining a first distance to left lane boundary from the reference line and a second distance to right lane boundary from the reference line, wherein the path planning objective function is constrained by the first and the second distances to keep the ADV a threshold distance from the left lane boundary and the right lane boundary.

19. The system of claim 16, wherein the cost to center the shifted trajectory to the reference line is quadratically or linearly proportional to the lateral shift distance value for the route.

20. The system of claim 16, wherein the operations further comprise generating the timestamp in a nanosecond format.

21. The system of claim 16, wherein one slot in the set of slots is associated with a lateral distance value of zero.

* * * * *